(12) United States Patent
Arnold et al.

(10) Patent No.: US 6,664,307 B2
(45) Date of Patent: Dec. 16, 2003

(54) LOW-SHRINKAGE EPOXY RESIN FORMULATION

(75) Inventors: John R. Arnold, Burlington, CT (US); Nicole M. Langer, Burlington, CT (US)

(73) Assignee: Dymax Corporation, Torrington, CT (US)

( * ) Notice: Subject to any disclaimer, the term of this patent is extended or adjusted under 35 U.S.C. 154(b) by 58 days.

(21) Appl. No.: 09/996,535

(22) Filed: Nov. 28, 2001

(65) Prior Publication Data

US 2003/0105191 A1 Jun. 5, 2003

Related U.S. Application Data

(60) Provisional application No. 60/338,823, filed on Nov. 3, 2001.

(51) Int. Cl.$^7$ .................................................. C08K 3/36
(52) U.S. Cl. ........................ 522/71; 522/136; 522/166; 523/440; 523/443; 523/444; 524/492
(58) Field of Search ............................ 522/71, 136, 166; 523/440, 443, 444; 524/492

(56) References Cited

U.S. PATENT DOCUMENTS 5,912,320 A * 6/1999 Hotta .......................... 528/373

* cited by examiner

*Primary Examiner*—Robert Dawson
*Assistant Examiner*—D. Aylward
(74) *Attorney, Agent, or Firm*—Ira S. Dorman

(57) ABSTRACT

Low-shrinkage positioning formulations include, in addition to the resin-forming composition, a filler comprised of fibrous and spherical elements, usually of glass, present in a defined ratio and amount. The resin formulation may desirably comprise epoxy resin and a copolymerizable monomer having amide, acrylamide, or hydroxyl functionality, and may advantageously be devoid of any cationic catalyst ingredient.

15 Claims, 1 Drawing Sheet

LOW-SHRINKAGE EPOXY RESIN FORMULATION

CROSS-REFERENCE TO RELATED APPLICATION

This application claims the benefit of United States Provisional Application No. 60/338,823, filed Nov. 3, 2001.

BACKGROUND OF THE INVENTION

So-called "positioning resins" must exhibit high dimensional stability and low movement throughout the range of operating conditions (especially thermal excursions) to which they are subjected. Stress, low durability, and insufficient strength to prevent relative movement between parts are primary causes of adhesive failure in many such applications, as in the manufacture of optical devices. Note might be made in this regard to a paper entitled "Advances in Light Curing Adhesives," Bachmann, A. G. (Proc. SPIE Vol. 4444, August 2001, pp 185–195).

In the present state of the art, the provision of resins of this kind normally focuses upon the glass transition temperature of the cured material as a measure of utility; it is common to use resins that are selected or formulated to have Tg values higher than necessary, to afford suitable tolerances. Reference might be made in this regard to an article by Tample-vich, T. W. and Moore, V. E., entitled: "The Significance of Glass Transition Temperature on Epoxy Resins for Fiber Optic Applications" (Epoxy Technology, Inc. 1980). The satisfaction of a high Tg criterion (if possible at all, as a practical matter) often means that other desirable properties, such as tensile strength, lap shear, adhesive bond strength and modulus, and specific surface characteristics, must be compromised or sacrificed.

Thus, there is a need for formulations that are suitable for use as adhesives, potting compounds, and the like, which are of practical viscosity, which cure and endure without significant shrinkage, which are virtually immobile after reaction even when subjected to heat cycles of substantial temperature variation, and which may additionally exhibit other desirable properties as well.

SUMMARY OF THE INVENTION

The broad object of the present invention is to provide formulations that satisfy the foregoing needs.

It has now been found that the foregoing and related objects of the invention are attained by the provision of a fluid mixture capable of curing to a substantially nonshrinking and immobile solid mass (e.g., a positioning resin), comprising: about 10 to 50 percent, based upon the weight of the mixture, of a composition capable of reaction to form a solid, resinous matrix; and conversely, about 90 to 50 percent, based upon the weight of the mixture, of a solid filler comprised of spherical elements and short fibrous elements present in a spherical element:fibrous element weight ratio in the range 0.1 to 6:1, the filler elements being substantially nonreactive to the reactive composition and exhibiting good adhesion to the resinous matrix; in preferred embodiments, the mixture will comprise at least about 25 weight percent of the reactive composition and not more than about 75 weight percent of the filler combination. The composition will usually contain a free radical photoinitiator, in an amount sufficient to render it readily curable by exposure to actinic radiation; thermal initiators may however also be used, as appropriate, alone or in combination with one or more photoinitiators.

The spherical filler elements will usually constitute about 30 to 45 weight percent of the mixture described, and the fibrous elements may constitute about 10 to 80 weight percent thereof. Preferably, the fibrous elements will constitute about 20 to 30 weight percent of the mixture, and the spherical element: fibrous element ratio range will be about 1 to 3:1. The spherical and fibrous filler elements will generally be made of glass, for transparency (especially when photoinitiators are used) and low coefficient of thermal expansion (albeit ceramic, mineral, metal,and synthetic and natural resinous elements may be employed in certain instances), and they may or may not carry a size coating (e.g., an epoxy sizing, such as Owens Corning 731-EC milled fiber, or a silane sizing, such as Owens Coming 737BC milled fiber; Owens Corning 739DC milled fiber, which is an unsized product, may also be used, for example, to good effect). Indeed, a surprising aspect of the invention (to be described more fully below) is that, whereas at least certain size coatings cause very poor adhesion in formulations filled with fibers only, the same formulation can exhibit extraordinary adhesion when spherical filler elements are also included, in suitable amounts.

The spherical elements will preferably be hollow in most instances, with a distribution range of, for example, 5 to 20 microns and a mean size of 9 to 13 microns; the fibrous elements will preferably be short, small diameter milled fibers (albeit chopped fibers may be employed as well, generally to lesser advantage) with a screen size (hole diameter) parameter ranging from $\frac{1}{16}$ to $\frac{1}{64}$ inch. Typically, the sphere diameter will be 10 mils or smaller, and equal to or (preferably) less than the diameter of the fibers. The size, composition, and form of the spheres and fibers will generally be selected so as to afford good suspension stability in the mixture. The solid mass produced will most desirably have a glass transition temperature in excess of 100° C.

Suitable solid glass spheres are available commercially from Potters Industries Inc. under its SPHERIGLASS trademark, and suitable hollow glass spheres are available from the same company under its SPHERICEL trademark. Ceramic microspheres that may also be suitable for use are available from Zeelan Industries under its ZEEOSPHERES W-210 designation.

Although a wide variety of polymerizable compositions can be employed to produce the resinous matrix, the composition will desirably comprise a substantial amount of epoxy, especially multifunctional epoxy, resin. More particularly, the photopolymerizable composition may advantageously comprise, based upon the total weight thereof, about 5 to 45 percent of an epoxy resin, about 94 to 55 percent of a copolymerizable material (i.e., monomer and/or oligomer), and about 1 to 10 percent of a free radical photoinitiator. The composition may, more specifically, comprise about 15 to 30 weight percent of epoxy resin, about 40 to 60 weight percent of at least one comonomer, about 20 to 35 weight percent of an oligomer that is reactive with the epoxy resin and the comonomer, and about 3 to 5 weight percent of the photoinitiator; in many instances it will, most advantageously, be devoid of any catalytic cationic ingredient.

The "at least one" comonomer will desirably be N,N-dimethylacrylamide, in which case the composition will beneficially contain about 20 weight percent of epoxy resin, about 50 weight percent of N,N-dimethylacrylamide, and about 25 weight percent of a cellulosic oligomer. More broadly, however, the comonomer compound will advantageously be selected from the group consisting of vinyl and (meth)acrylic monomers containing acrylamide or amide functionality, or an hydroxyl group. Thus, additional specific members of the comonomer group include, for example, n-vinyl 2-pyrrolidone, n-vinylcaprolactam, acryloyl morpholine, N-(n-butoxymethyl) acrylamide, N-isopropyl acrylamide, N-3-dimethylaminopropyl methacrylamide, glycerol 1,3-diglycerolate diacrylate, 4-hydroxybutyl acrylate, 2-hydroxyethyl methacrylate, and (meth)acrylic acid; this group may also include acrylated polyols and vinyl polyols, albeit such compounds may be of either monomeric or oligomeric character.

When the comonomer is or includes a compound containing the amide or acrylamide functionality, that compound will usually be present in an amount not in excess of 80 weight percent of the polymerizable composition, and preferably the amount will be at least about 50 weight percent. When the comonomer is or includes a compound containing the hydroxyl group, that compound will usually be present in an amount not in excess of about 70 weight percent, and preferably the amount will be at least about 20 weight percent.

DESCRIPTION OF THE DRAWING

As can be seen, Adhesives 1 and 2, which embody the invention, show minimal movement with increasing temperature, and thus afford exceptional positional stability to components secured thereby, coupled with high levels of durability. Moreover, FIG. 1 shows that the formulations of the invention maintain dimensional stability and low total movement irrespective of $T_g$. This is a most surprising property, which uniquely enables customization of adhesives, potting compounds, etc. for the optimization of properties other than $T_g$, such as for example to maximize adhesive bond strength.

DESCRIPTION OF ADDITIONAL EMBODIMENTS

EXAMPLE ONE

Figure 1:
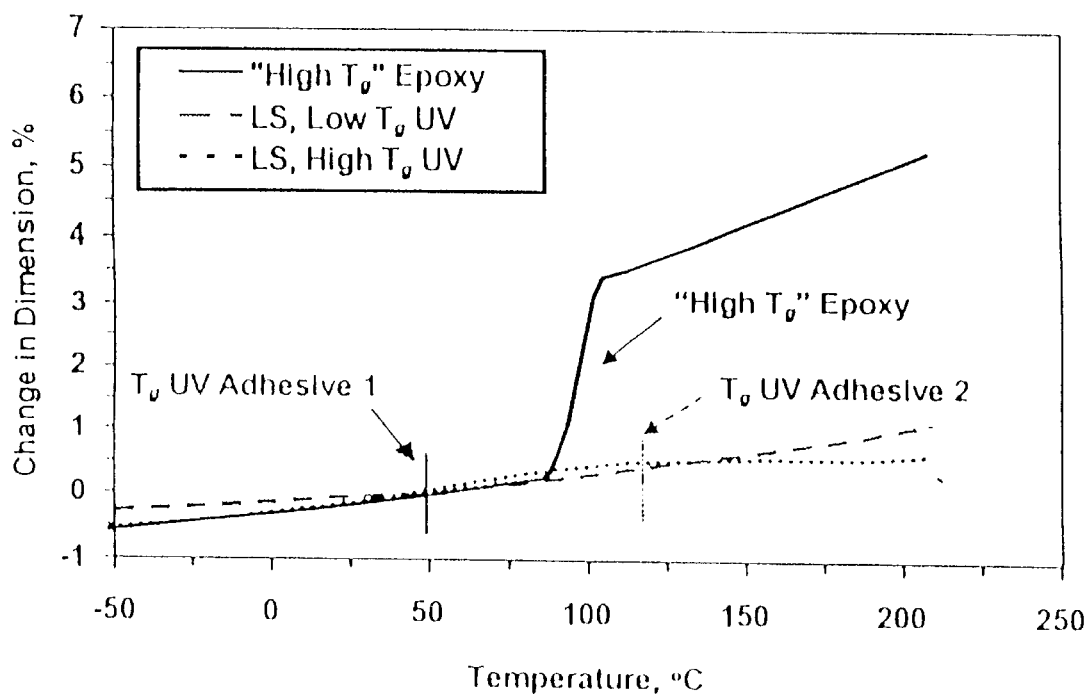
FIG. 1 is a graph showing the percentage change in linear dimension, as a function of temperature, of three adhesives. The low $T_g$ adhesive (Adhesive 1) consists, on a weight basis, of an acrylamide monomer (11%), a triacrylate monomer (5%), UV and visible photoinitiators (1.5% each), silane (1%), urethane oligomer (11%), milled EC glass fibers, screen size 1/32 inch and nominal diameter of 16 microns (26%), glass spheres of 8 micron nominal diameter (40%), and acrylic acid (3%). The high $T_g$ adhesive (Adhesive 2) is similar, but contains 9% of the acrylamide monomer, 8% of the triacrylate monomer, and 10% of the oligomer. The "High $T_g$ Epoxy" data are provided for purposes of comparison; the resin does not embody the invention.

Compositions, prepared by combining the ingredients identified in Table One below in the amounts (by weight) set forth, are suitable for use in the formulations of the invention. Droplets of each composition on a microscope slide are cured by subjecting them to UV/visible actinic radiation (100 mW/cm$^2$, 30 seconds exposure), and are tested; the observations made are set forth in the Table (DAROCUR 1173 and IRGACURE 184 are UV/visible photoinitiators).

Compositions 1 through 6 demonstrate free radical polymerization of acrylamide and hydroxy acrylate with epoxy compounds, whereas compositions 7 and 8 confirm the relatively poor results that would be expected in attempting to polymerize epoxy resin formulations with free radical photoinitiators only (i.e., without a cationic catalyst). The excellent curing that occurs in compositions 1 through 6, due ostensibly to the presence of acrylamide and/or hydroxyl functionalities will, on the other hand, be recognized by those skilled in the art to be a most surprising result.

TABLE ONE

| Ingredient | 1 | 2 | 3 | 4 | 5 | 6 | 7 | 8 |
|---|---|---|---|---|---|---|---|---|
| N,N-dimethyl acrylamide (DMA) | 49.0 | 74.0 | — | 49.0 | 74.0 | — | — | — |
| Hydroxyethylmethacrylate (HEMA) | 24.5 | — | 74.0 | 24.5 | — | 74.0 | — | — |
| Tactic 742, multifunctional epoxy, Tris(hydroxyl phenyl)methane-based epoxy, Ciba | 23.0 | 22.5 | 22.5 | — | — | — | — | — |
| GY 6010, Bisphenol A epoxy, Ciba | — | — | — | 23.0 | 22.5 | 22.5 | 96.5 | 22.5 |
| Isobornyl acrylate (IBOA) | — | — | — | — | — | — | — | 74.0 |
| Darocur 1173 | — | — | — | 3.5 | 3.5 | 3.5 | 3.5 | 3.5 |
| Irgacure 184 | 3.5 | 3.5 | 3.5 | — | — | — | — | — |
| Total grams | 100.0 | 100.0 | 100.0 | 100.0 | 100.0 | 100.0 | 100.0 | 100.0 |
| Test | | | | | | | | |
| cure through | yes | yes | yes | yes | yes | yes | no cure | yes |
| surface | tack free | tack free | tack free | tack free | tack free | tack free | liquid | tack free |
| pick test adhesion to glass | good | good | good | good | good | good | na | poor |
| uniform | yes | yes | yes | yes | yes | yes | na | plasticized |
| cured color | clear | clear | clear | clear | clear | hazy | clear | swirls |

EXAMPLE TWO

A series of compositions suitable for use in the instant formulations are prepared by combining the ingredients identified in Table Two below, in the amounts (by weight) set forth. Droplets of each composition on a microscope slide are cured by subjecting them to UV/visible actinic radiation (150 mW/cm$^2$, 15 seconds exposure), and are tested; observations made are set forth in the Table (DAROCUR 4265 is a UV/visible photoinitiator). Compositions 9 through 22 demonstrate polymerization of epoxy formulations using only free-radical photoinitiators. It is expected that all vinyl amides and acrylamides that free-radical photocure, and all (meth)acrylates containing an hydroxyl group, would react similarly, in accordance with the instant disclosure.

TABLE TWO

| Ingredient | | | | | | | |
|---|---|---|---|---|---|---|---|
| n-Vinyl 2-pyrrolidone | — | — | — | — | — | — | — |
| n-Vinylcaprolactam | 49.24 | — | — | — | — | — | — |
| Acryloyl Morpholine | — | — | — | — | — | — | 51.86 |
| N,N-dimethyl acrylamide | — | — | 47.17 | 48.72 | 48.56 | 49.27 | — |
| N-(n-butoxymethyl) acrylamide | — | 42.79 | — | — | — | — | — |
| N-isopropyl acrylamide | — | — | — | — | — | — | — |
| N-3-Dimethylaminopropyl methacrylamide | — | — | — | — | — | — | — |
| Glycerol 1,3-diglycerolate diacrylate | 24.69 | — | 24.84 | — | — | — | 24.89 |
| 4-Hydroxybutyl acrylate | — | — | — | 24.75 | — | — | — |
| 2-Hydroxyethyl methacrylate | — | 34.52 | — | — | 24.28 | — | — |
| Acrylic Acid | — | — | — | — | — | 25.45 | — |
| Tactic 742, multifunctional epoxy | 20.22 | 17.49 | 22.52 | 21.02 | 21.79 | 20.10 | 18.67 |
| Tris(hydroxy phenyl)methane-based epoxy | | | | | | | |
| GY 6010, diglycidyl ether of bisphenol A | — | — | — | — | — | — | — |
| Darocur 4265 | 5.84 | 5.20 | 5.47 | 5.51 | 5.37 | 5.19 | 4.58 |
| | | | | | | | |
| Total grams | 100.00 | 100.00 | 100.00 | 100.00 | 100.00 | 100.00 | 100.00 |
| adhesion to glass, pick test | very good | excellent | excellent | excellent | excellent | excellent | excellent |
| adhesion to steel, pick test | good | poor | good | excellent | excellent | excellent | fair |
| through cure | yes | yes | yes | yes | yes | yes | yes |
| tack free surface | yes | yes | yes | yes | yes | yes | yes |
| QC stability test, 140° F. oven. >2 days = pass | pass | pass | pass | pass | pass | pass | pass |

| Ingredient | | | | | | | |
|---|---|---|---|---|---|---|---|
| n-Vinyl 2-pyrrolidone | — | — | — | — | 39.15 | — | — |
| n-Vinylcaprolactam | — | — | — | — | — | — | — |
| Acryloyl Morpholine | — | — | — | — | — | — | — |
| N,N-dimethyl acrylamide | — | 50.97 | — | 49.71 | — | 22.29 | 18.95 |
| N-(n-butoxymethyl) acrylamide | — | — | — | — | — | — | — |
| N-isopropyl acrylamide | 23.59 | — | — | — | — | — | — |
| N-3-Dimethylaminopropyl methacrylamide | — | — | 46.34 | — | — | — | — |
| Glycerol 1,3-diglycerolate diacrylate | — | 26.39 | 25.00 | 24.60 | 20.98 | — | — |
| 4-Hydroxybutyl acrylate | — | — | — | — | — | — | — |
| 2-Hydroxyethyl methacrylate | 44.50 | — | — | — | — | 20.93 | 17.78 |
| Acrylic Acid | — | — | — | — | — | — | — |
| Tactic 742, multifunctional epoxy | 24.92 | — | 25.00 | 21.25 | 36.00 | 8.05 | 6.84 |
| Tris(hydroxy phenyl)methane-based epoxy | | | | | | | |
| GY 6010, diglycidyl ether of bisphenol A | — | 17.36 | — | — | — | 42.70 | 51.3 |
| Darocur 4265 | 6.99 | 5.28 | 3.66 | 4.44 | 3.87 | 6.04 | 5.13 |
| | | | | | | | |
| Total grams | 100.00 | 100.00 | 100.00 | 100.00 | 100.00 | 100.00 | 100.00 |
| adhesion to glass, pick test | very good | very good | not tested | fair | fair | fair | too much epoxy |
| adhesion to steel, pick test | excellent | poor | not tested | poor | fair | fair + | |
| through cure | yes | yes | yes | yes | yes | yes | plasticizie |
| tack free surface | yes | yes | yes | yes | yes | yes | no |
| QC stability test, 140° F. oven. >2 days = pass | pass | pass | polymerizes in hours at room temperature | pass | pass | pass | pass |

EXAMPLE THREE

A series of compositions suitable for use in the formulations hereof are prepared by combining the ingredients identified in Table Three below, in the amounts (by weight) set forth. Droplets of each composition on a microscope slide are cured by subjecting them to UV/visible actinic radiation (100 mW/cm$^2$, 30 seconds exposure), and are tested; observations made are set forth in the Table. Compositions 23, 25 and 27 cure quickly and uniformly in the absence of any cationic catalyst; contrary to expectation, the addition of a cationic photoinitiator (compositions 24, 26 and 28) retards cure.

TABLE THREE

| Ingredients | 23 | 24 | 25 | 26 | 27 | 28 |
|---|---|---|---|---|---|---|
| N,N-dimethyl acrylamide | 74.0 | 72.3 | — | — | 49.0 | 70.5 |
| HEMA | — | — | 74.0 | 71.1 | 24.5 | — |
| IBOA | — | — | — | — | — | — |
| Tactic 742, muitifunctional epoxy | — | — | — | — | 23.0 | 22.2 |
| Tris(hydroxyl phenyl)methane-based epoxy | | | | | | |
| GY 6010 | 22.5 | 21.5 | 22.5 | 22.3 | — | — |
| Irgacure 184 | — | — | — | — | 3.5 | 4.0 |

TABLE THREE-continued

| Ingredients | 23 | 24 | 25 | 26 | 27 | 28 |
|---|---|---|---|---|---|---|
| Darocur 1173 | 3.5 | 3.3 | 3.5 | 3.3 | — | — |
| UVI-6976, Mixed Triarylsulfonium | — | 3.0 | — | 3.3 | — | 3.3 |
| Hexafluoroantimonate salts | | | | | | |
| Total grams | 100.0 | 100.0 | 100.0 | 100.0 | 100.0 | 100.0 |
| Tests | | | | | | |
| cure through | yes | cures | yes | cures | yes | poor |
| surface | tack free | tacky | tack free | tacky | tack free | tacky |
| pick test adhesion to glass | good | good | good | good | good | good |
| uniform | yes | good | yes | ripples | yes | rippled |
| cured color | clear | clear | hazy | hazy | clear | orange |

EXAMPLE FOUR

Exemplary of the effects of utilizing fillers in two different resins (Resin A and Resin B) are the data set forth below in Table Four. Resin A may be formulated in accordance with U.S. Pat. No. 4,964,938, Example One (which disclosure is incorporated hereunto by reference thereto). Resin B is the composition employed to produce (by the addition of the filler elements) the high $T_g$ adhesive (Adhesive 2) described above in connection with FIG. 1. The photoinitiators referred to are free radical generators.

As can be seen by comparing the data in the last three columns of the Table with the data in the first five columns, formulations embodying the invention produce resins in which shrinkage is minimized and is not proportional to filler content. Moreover, the data in respect of shrinkage upon heating to 120° C., the data in respect of filler separation, and the data in respect of viscosity all demonstrate the unexpected benefits of the instant formulations.

The $Al_2O_3$ and aluminum trihydroxide (ATH) fillers referred to in Table Four are of particulate form, and the "EC Glass fiber" (Owens Coming 731EC; 1/32 inch) carries an epoxy size coating. The shear data in the sixth and seventh columns (976 and 3494 psi, respectively) illustrate the surprising effect that the inclusion of spherical elements has upon adhesion in the presence of a size coating, as mentioned above.

TABLE FIVE

| Product Name | D | E | F |
|---|---|---|---|
| acrylamide | 10.77 | — | 18.73 |
| Hydroxyacrylate | — | 9.23 | — |
| acrylate | — | 11.22 | — |
| acrylate | 5.00 | 0.77 | — |
| thickener | — | 0.43 | — |
| monomer/oligomer | — | — | 9.31 |
| epoxy | 0.04 | — | — |
| stabilizer | 0.02 | — | — |
| stabilizer | 0.14 | 0.04 | 0.06 |
| stabilizer | — | — | 0.06 |
| silane | 1.13 | 0.60 | 0.79 |
| silane | — | — | 0.79 |
| UV Photoinitiator | 1.39 | — | — |
| UV Photoinitiator | — | 0.95 | 2.27 |
| UV-Visible Photoinitiator | 1.73 | 0.30 | 0.79 |
| Urethane acrylate oligomer | — | 8.54 | — |
| Urethane acrylate oligomer | 9.83 | — | — |
| Epoxy | — | — | 8.51 |
| Silica thickener | 1.00 | 1.00 | 0.57 |
| EC treated milled glass | 25.75 | 25.47 | 22.66 |
| glass spheres | 40.20 | 39.80 | 35.46 |
| acrylic acid | 3.00 | 1.65 | — |

It will be appreciated by those skilled in the art that the broad concepts of the present invention are not limited by or to the use of any particular polymerizable composition or

TABLE FOUR

| | Resin A Unfilled | Resin B unfilled | Resin A 60% Al2O3 filler | Resin B 60% ATH filler | Resin A + Ceramic Spheres | Resin A + 65% EC-Glass fiber | Resin A + 26% EC-Glass fiber + 40% glass spheres | Resin B + 23% EC-Glass fiber + 35% glass spheres |
|---|---|---|---|---|---|---|---|---|
| Linear Shrinkage during UV cure ASTM D-2566 | 2.0% | 1.4% | 0.6% | 0.6% | 0.8% | <0.1% | <0.1. | <0.1 |
| Shrinkage arter UV and Heating to 120° C., 16 hrs | 3.5% | 3.5% | 1.5% | 1.0% | 1.6% | <0.1% | <0.1 | <0.1 |
| Filler separation at 70° F. | No filler | No filler | 10–20 weeks | 15 weeks | 1 day | >20 weeks | >20 weeks | >20 weeks |
| Brookfield Viscosity at 20 rpm | 400 cP liquid | 3,000 cP liquid | 90,000 cP paste | 200,000 cP paste | 200,000 cP paste | Paste too thick to measure | 50,000 cP Gel | 120,000 cP Gel |
| Tensile Compression Shear, Glass to Glass | 3400 psi | 2417 psi | 3000 psi | 1780 psi | 3511 psi | 976 psi* | 3494 psi | 1937 psi |

*adhesive failure (adhesive pulls off glass) in all other joints the glass broke before the adhesive

EXAMPLE FIVE

Table Five defines additional filled positioning resins embodying the invention. Here again, the photoinitiators referred to are free radical generators.

polymerization mechanism, as long as the system is compatible with the fillers incorporated. Although vinyl ester, thiophene, urethane, and like systems might be mentioned as alternatives, it will be evident from the Examples given above that preferred composition will, in many instances, comprise an epoxy or acrylate-based free radical-curing system. Suitable acrylate compositions are more fully described, for example, in the passage beginning at line 35 in column 5 through line 50 in column 6 of U.S. Pat. No. 5,728,787, and suitable epoxy resins include cycloaliphatic epoxies, Bisphenol A resins, Bisphenol F resins, resorcinol diglycidyl ether, epoxy phenol novolac resin, epoxy cresol novolac, glycidyl ethers, halogenated diglycidylethers, polyglycol diepoxides, epoxidized oils (e.g., epoxidized linseed oil, epoxidized soy bean oil, epoxidized octyl tallate, etc), epoxidized elastomers (e.g., epoxidized polybutadiene, epoxidized polyisoprene, epoxidized rubber), epoxidized siloxanes and silicones, and glycidyl isocyanurates; specific, epoxide compositions are set forth, for example, in the paragraph beginning at line 43 in column 4 of U.S. Pat. No. 4,595,604 and in the passage beginning at line 47 of column 3 through line 65 of column 4 of U.S. Pat. No. 5,514,729; the disclosures of these patents are incorporated hereunto by reference thereto.

About 1 to 10 weight percent of acrylic acid or methacrylic acid will beneficially be employed in an acrylate formulation, especially to increase adhesion, and a tautomeric acid constituent may contribute to bond strength. A free-radical reactive oligomer will normally also be included, as is well known in the art, the urethane polymers and prepolymers often being found most beneficial; diisocyanate-capped polyethers and polyesters, acrylated by reaction with hydroxyethyl acrylate or hydroxyethyl methcrylate and having a molecular weight of about 400 to 6,000, are particularly preferred.

Although the concepts of the invention are also not dependent upon the use of any particular photoinitiator, those that respond in the ultraviolet and/or visible spectral regions will normally be preferred, as a practical matter. Indeed, because the fillers may reflect visible light more efficiently than UV radiation, photoinitiators that respond to radiation that includes visible wavelengths will often be employed to greatest advantage.

In addition to the compounds identified above (or more fully defining them), a further listing of conventional photoinitiators that might be utilized herein include hexyltriaryl borates, camphorquinone, dimethoxy-2-phenylacetophenone (IRGACURE 651); 2-benzyl-2-N, N-dimethyl amino-1-(4-morpholinophenyl)-1-butanone (IRGACURE 369); bis($\mu^5$-2,4-cycloypentadien-1-yl)bis[2, 6-difluoro-3-(1H-pyrrol-1-yl)phenyl]titanium (IRGACURE 784DC); and 2-hydroxy-2-methyl-l-phenyl-propane-1-one (DAROCURE 1173), as well as the photoinitiators disclosed in U.S. Pat. No. 4,820,744, particularly at line 43, column 4, through line 7, column 7 (which disclosure is incorporated hereunto by referent thereto). Suitable alternative UV/visible photoinitiators include DAROCUR 4265, which is a 50 percent solution of 2,4,5-trimethyl benzoyl diphenylphosphine oxide in DAROCUR 1173, and IRGACURE 819, phosphine oxide, phenyl-bis(2,4,6-trimethyl) benzoyl. The formulations may additionally include dye coinitiators, such as QTX, safranine O, eosin B, rose bengal b, cyanine, pyronin GY, pyrillium, cresyl violet brilliant green, lissamine green BN, rhodamine B, methylene blue, and crystal violet. and cationic photoinitiators represent another class of catalytic agents that can be employed herein, in appropriate circumstances.

Particularly in instances in which the formulation is to be utilized is an acrylate potting compound, it may be especially desirable to incorporate a chain transfer agent of the kind that is typically employed in compositions that are cured by electron beam initiation; e.g., halogen compounds, sulfur compounds, and secondary and tertiary aromatic hydrocarbons such as cumeme, carbon tetrachloride, 1,4-disopropyl benzene, t-butyl benzene, bisphenol A and glycidyl ether derivatives thereof, etc. The use of chain transfer agents may serve to modify the hardness of the resultant polymer, the degree of which will depend to an extent upon the concentration of the agent in the formulation, which will typically be in the range 0.5 to 5.0 weight percent.

Other materials may be incorporated into the instant formulations in addition to the components hereinabove described, to the extent that doing so is consistent with the objects set forth and implicit in the foregoing disclosure. For example, "inert" fillers such as wood flour, cornstarch, glass elements (other than those disclosed), cotton linters, mica, alumina, silica, and the like, may be used to modify viscosity, improve impact resistance, and for other purposes. Substances such as dyes, flame retarders, fillers to increase electrical conductivity, stabilizers (e.g., the quinones and hydroquinones), viscosity modifiers (thixotropes, whether or not conductive, thickeners, viscosity reducers), plasticizers, antioxidants, and the like, may be incorporated as well.

Although amounts of ingredients are expressed hereinabove as parts and percentages by weight, that it is done largely as a matter of convenience; volumetric values will often provide a more meaningful characterization because of the wide variations that exist in the densities of ingredients (especially the fillers) that are suitable for use herein. While therefore the numerical values expressed will provide guidance to those skilled in the art, they are not to be construed as unduly limiting the scope of the invention.

Thus, it can be seen that the present invention provides formulations that satisfy the objects of the invention, as hereinabove set forth. An unexpected synergy between the spherical and fibrous elements, employed in accordance herewith, contributes to or produces a number of benefits: virtually no shrinkage occurs during cure, and there is virtually no physical movement of bonded components during curing or heat cycling, or under other ambient conditions; desirable dispensing characteristics, and storage stability against separation of the filler elements are afforded; and an ability to produce relatively thick films and other deposits is provided. Moreover, because these characteristics are afforded irrespective of $T_g$, the formulations can be customized to optimize other properties, such adhesive bond strength, surface characteristics, etc.

Having thus described the invention what is claimed is:

1. A fluid mixture capable of curing to a substantially nonshrinking and immobile solid mass, comprising:
   about 10 to 50 percent, based upon the weight of said mixture, of a composition capable of reaction to form a solid, resinous matrix; and
   conversely, about 90 to 50 percent, based upon the weight of said mixture, of a solid filler comprised of spherical elements and short fibrous elements present in a spherical element:fibrous element weight ratio in the range 0.1 to 6:1, said filler elements being substantially nonreactive to said composition and exhibiting good adhesion to said resinous matrix.

2. The mixture of claim 1 comprising at least about 25 weight percent of said reactive composition and, conversely, not more than about 75 weight percent of said filler elements.

3. The mixture of claim 1 wherein said composition contains a free radical photoinitiator in an amount sufficient to render said composition readily curable by exposure to actinic radiation.

4. The mixture of claim 3 wherein said composition comprises a substantial amount of epoxy resin.

5. The mixture of claim 4 wherein said epoxy resin is multifunctional.

6. The mixture of claim 5 wherein said composition comprises about 15 to 30 weight percent of epoxy resin; about 40 to 60 weight percent of at least one monomer copolymerizable with said epoxy resin, selected from the group consisting of (1) an acrylamide and (2) a vinyl or (meth) acrylic monomer containing amide functionality or a hydroxyl group; about 20 to 35 weight percent of an oligomer that is reactive with said epoxy resin and said copolymerizable monomer; and about 3 to 5 weight percent of said photoinitiator, said mixture being devoid of any cationic catalytic ingredient.

7. The mixture of claim 6 wherein said at least one copolymerizable monomer is N,N-dimethylacrylamide.

8. The mixture of claim 7 wherein said composition contains about 20 weight percent of epoxy resin, about 50 weight percent of N,N-dimethylacrylamide, and about 25 weight percent of a cellulosic oligomer.

9. The mixture of claim 1 wherein said spherical elements constitute about 30 to 45 weight percent of said mixture and said fibrous elements constitute about 10 to 80 weight percent thereof.

10. The mixture of claim 9 wherein said fibrous elements constitute about 20 to 30 weight percent thereof.

11. The mixture of claim 9 wherein said ratio range is about 1 to 3:1.

12. The mixture of claim 1 wherein said spherical and fibrous filler elements are made of glass.

13. The mixture of claim 1 wherein said spherical elements are hollow.

14. The mixture of claim 1 wherein said fibrous elements are milled fibers.

15. The mixture of claim 4 wherein the solid mass has a glass transition temperature in excess of 100° C.

* * * * *